(12) United States Patent
Hong et al.

(10) Patent No.: US 11,417,875 B2
(45) Date of Patent: Aug. 16, 2022

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: SAMSUNG SDI CO., LTD., Yongin-si (KR)

(72) Inventors: Soonkie Hong, Yongin-si (KR); Young-Ki Kim, Yongin-si (KR); Jungjoon Park, Yongin-si (KR); Soonrewl Lee, Yongin-si (KR); Youngjoo Chae, Yongin-si (KR); Ickkyu Choi, Yongin-si (KR); Mingzi Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 310 days.

(21) Appl. No.: 16/670,850

(22) Filed: Oct. 31, 2019

(65) Prior Publication Data
US 2020/0144610 A1 May 7, 2020

(30) Foreign Application Priority Data
Nov. 2, 2018 (KR) .................. 10-2018-0133787

(51) Int. Cl.
*H01M 4/36* (2006.01)
*H01M 4/525* (2010.01)
(Continued)

(52) U.S. Cl.
CPC ........... *H01M 4/366* (2013.01); *H01M 4/525* (2013.01); *H01M 10/0525* (2013.01); *H01M 2004/028* (2013.01)

(58) Field of Classification Search
CPC ....... H01M 10/0525; H01M 2004/028; H01M 4/366; H01M 4/525
See application file for complete search history.

(56) References Cited

U.S. PATENT DOCUMENTS

2011/0089368 A1   4/2011   Tu
2014/0197357 A1   7/2014   Ofer et al.
(Continued)

FOREIGN PATENT DOCUMENTS

CN   104282903 A   1/2015
CN   107732193 A   2/2018
(Continued)

OTHER PUBLICATIONS

CNIPA Office Action and Search Report dated Sep. 8, 2021 issued in corresponding Chinese Patent Application No. 201911058343.2, with English translation, 21 pages.
(Continued)

*Primary Examiner* — Carlos Barcena
(74) *Attorney, Agent, or Firm* — Lewis Roca Rothgerber Christie LLP

(57) ABSTRACT

A positive active material for a rechargeable lithium battery includes a nickel-based lithium transition metal oxide including a secondary particle in which a plurality of primary particles are agglomerated, wherein the secondary particle includes a core and a surface layer surrounding the core, and the surface layer includes a plurality of primary particles and a nano-sized cobalt-based lithium transition metal oxide absorbed in the surface layer, between the primary particles.

21 Claims, 8 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 2014/0205898 A1* | 7/2014 | Lee | H01M 4/0402 |
| | | | 429/211 |
| 2014/0212749 A1 | 7/2014 | Choi et al. | |
| 2015/0010819 A1 | 1/2015 | Lee et al. | |
| 2016/0181611 A1 | 6/2016 | Cho et al. | |
| 2017/0077513 A1 | 3/2017 | Han et al. | |
| 2018/0026268 A1 | 1/2018 | Kim et al. | |
| 2018/0048015 A1 | 2/2018 | Lee et al. | |
| 2018/0108940 A1 | 4/2018 | Kwon et al. | |
| 2018/0233740 A1 | 8/2018 | You et al. | |

FOREIGN PATENT DOCUMENTS

| | | |
|---|---|---|
| EP | 3 249 723 A1 | 11/2017 |
| EP | 3 272 710 A1 | 1/2018 |
| EP | 3 291 340 A1 | 3/2018 |
| JP | 2006-73482 A | 3/2006 |
| JP | 2009-193686 A | 8/2009 |
| JP | 2009-266433 A | 11/2009 |
| JP | 2011-86603 A | 4/2011 |
| JP | 2018-14208 A | 1/2018 |
| JP | 2018-523899 A | 8/2018 |
| KR | 10-2011-0132287 A | 12/2011 |
| KR | 10-2013-0105494 A | 9/2013 |
| KR | 10-2014-0047657 A | 4/2014 |
| KR | 10-2015-0006283 A | 1/2015 |
| KR | 10-2016-0074236 A | 6/2016 |
| KR | 10-2017-0030796 A | 3/2017 |
| WO | 2006/027925 A2 | 3/2006 |
| WO | 2017/057078 A1 | 4/2017 |

OTHER PUBLICATIONS

EPO Office Action dated Sep. 7, 2021, issued in corresponding European Patent Application No. 19206384.0, 4 pages.
Arakawa, Masafumi, "Introduction to particle size measurement," Journal of the Society of Powder Technology, vol. 17, No. 6, 1980, pp. 299-307, Japan. [English version not available].
Korean Office Action dated Oct. 8, 2020, issued in corresponding Korean Patent Application No. 10-2018-0133787 (8 pages).
Japanese Office Action, with English translation, dated Oct. 26, 2020, issued in corresponding Japanese Patent Application No. 2019-199978 (14 pages).
Extended European Search Report for corresponding European Patent Application No. 19206384.0, dated Mar. 26, 2020, 6 pages.
Korean Intellectual Property Office Action for corresponding Korean Patent Application No. 10-2018-0133787, dated Feb. 19, 2020, 7 pages.
Chinese Office Action dated Jun. 10, 2022, for Application No. 201911058313.2, and corresponding English Translation, 20 pages.

* cited by examiner

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2018-0133787, filed in the Korean Intellectual Property Office on Nov. 2, 2018, the entire content of which is incorporated herein by reference.

BACKGROUND

1. Field

One or more aspects of embodiments of the present disclosure are directed toward a positive active material for a rechargeable lithium battery, a method of preparing the same, and a rechargeable lithium battery including the same.

2. Description of the Related Art

Down-sizing and weight reduction of high energy density rechargeable lithium batteries have become increasingly important in terms of meeting the small size and high performance requirements of various electronic devices. In addition, high capacity and high temperature and/or high voltage stability of rechargeable lithium batteries are of increasing importance for electric vehicle applications and the like.

Various positive active materials have been investigated for use in rechargeable lithium batteries Nickel (Ni)-based lithium transition metal oxides including a combination of Ni, cobalt (Co), and manganese (Mn) generally provide higher discharge capacities per unit weight compared to $LiCoO_2$, but have lower capacity per unit volume due to their low material density, and exhibit low discharge capacity in a rechargeable lithium battery. In addition, rechargeable lithium batteries including a nickel-based lithium transition metal oxide may have deteriorated safety during operation at high voltage.

Therefore, it is desirable to improve the filling density and thermal stability of nickel-based lithium transition metal oxide and to increase the mixture density of a positive electrode plate.

SUMMARY

One or more aspects of embodiments of the present disclosure are directed toward a positive active material having improved charge and discharge capacity, efficiency, and/or cycle-life.

One or more aspects of embodiments of the present disclosure are directed toward a method of preparing the positive active material.

One or more aspects of embodiments of the present disclosure are directed toward a rechargeable lithium battery including the positive active material.

One or more example embodiments of the present disclosure provide a positive active material for a rechargeable lithium battery including a nickel-based lithium transition metal oxide including a secondary particle in which a plurality of primary particles are agglomerated, wherein the secondary particle includes a core and a surface layer surrounding the core, and the surface layer includes a plurality of primary particles and a nano-sized cobalt-based lithium transition metal oxide soaked (absorbed) into the surface layer among (between) the primary particles.

The secondary particle may include a small particle diameter secondary particle having an average particle diameter (D50) of about 2 μm to about 5 μm, and a large particle diameter secondary particle having an average particle diameter of about 15 μm to about 20 μm.

The cobalt-based lithium transition metal oxide may have an average particle diameter of about 100 nm to about 200 nm.

A content of the cobalt-based lithium transition metal oxide may be about 5 wt % to about 15 wt % based on a total amount of 100 wt % of the positive active material.

The cobalt-based lithium transition metal oxide may be a compound represented by Chemical Formula 1:

$$Li_aCo_xM_{1-x}O_2.$$  Chemical Formula 1

In Chemical Formula 1, 0.9≤a≤1.05, 0.8≤x≤1.0, and M may be at least one metal element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

The surface layer may be a region corresponding to a depth of about 150 nm to about 200 nm from the surface (outer surface) of the positive active material.

A differential charge capacity (dQ/dV)-voltage curve of a rechargeable lithium battery including the positive active material may not have (e.g., may not exhibit) a peak between about 3.8 V to about 4.0 V.

The nickel-based lithium transition metal oxide may be a compound represented by Chemical Formula 2:

$$Li_aNi_xCo_yM_zO_2.$$  Chemical Formula 2

In Chemical Formula 2, 0.9≤a≤1.05, 0.4≤x≤0.95, 0.1≤y≤0.3, 0.1≤z≤0.3, x+y+z=1, and M may be at least one metal element selected from Mn, Al, Cr, Fe, V, Mg, Ti, Zr, Nb, Mo, W, Cu, Zn, Ga, In, Sn, La, and Ce.

A mixing ratio by weight of the large particle diameter secondary particle and the small particle diameter secondary particle may be about 90:10 to about 50:50.

The small particle diameter secondary particle may have a needle-shape, a sheet-shape, or a combination thereof.

The positive active material may further include the cobalt-based lithium transition metal oxide on the surface layer.

One or more example embodiments of the present disclosure provide a method of preparing a positive active material for a rechargeable lithium battery that includes: mixing a nickel-based transition metal hydroxide and a lithium salt to prepare a first mixture; first heat-treating the first mixture under a rapid temperature-increasing condition at (to) about 800° C. to about 1000° C. to prepare a first fired product including residual lithium; mixing the first fired product with a cobalt-based transition metal hydroxide to prepare a second mixture, and second heat-treating the second mixture at about 750° C. to about 950° C. to obtain the positive active material.

The nickel-based transition metal hydroxide may include a large particle diameter secondary particle having an average particle diameter of about 15 μm to about 20 μm, and a small particle diameter secondary particle having an average particle diameter of about 2 μm to about 5 μm, mixed in a weight ratio of about 90:10 to about 50:50.

In the first mixture, a mole ratio of Li/(Ni+Co+Mn) may be greater than or equal to about 0.99.

The rapid temperature-increasing condition may include a process where a temperature is raised from a starting temperature of about 25° C. to about 100° C. to a first heat-treating reaction temperature of about 800° C. to about 1000° C. at a rate of about 4° C./min to about 6° C./min.

The first heat-treating may be performed in an air atmosphere or an oxidizing gas atmosphere for about 1 hour to about 4 hours.

The cobalt-based transition metal hydroxide may include $Co(OH)_2$.

The cobalt-based transition metal hydroxide may have an average particle diameter of about 100 nm to about 200 nm.

The lithium salt may include at least one selected from lithium hydroxide, lithium carbonate, lithium sulfate, and lithium nitrate.

The small particle diameter secondary particle may have a needle-shape, a sheet-shape, or a combination thereof.

One or more example embodiments of the present disclosure provide a rechargeable lithium battery including a positive electrode including the positive active material; a negative electrode including a negative active material; and an electrolyte with the positive electrode and the negative electrode.

In one or more of the above example embodiments, a pellet density of the positive active material powder and/or a mixture density of the positive electrode may be improved.

The rechargeable lithium battery may be advantageous for high temperature and high voltage by including the cobalt-based lithium transition metal oxides.

The rechargeable lithium battery may have high temperature cycle-life characteristics and/or improved charge and discharge efficiency by reducing an amount of gas generated at high voltage.

DETAILED DESCRIPTION

Figure 1:
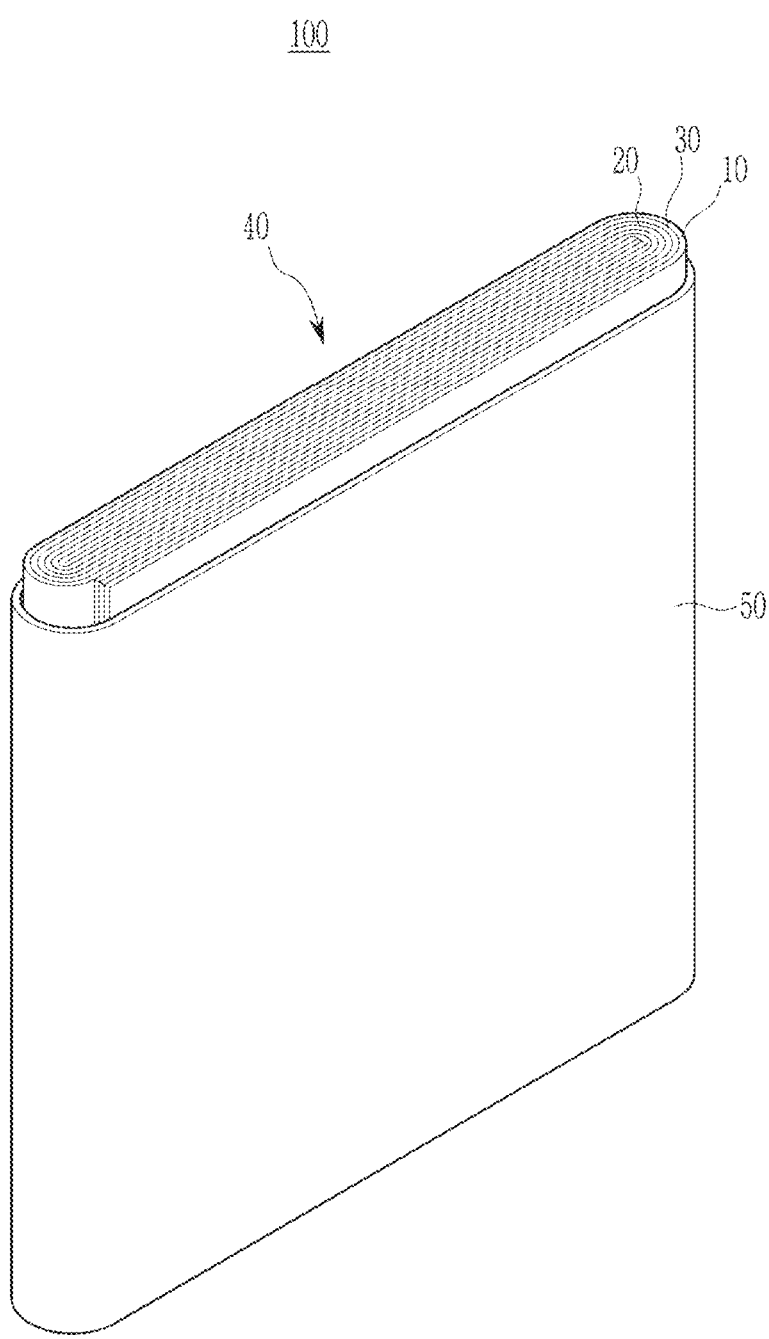
FIG. 1 is a schematic view showing a structure of a positive active material according to an embodiment of the present disclosure.

Hereinafter, embodiments of the present invention are described in more detail. However, these embodiments are exemplary, the present disclosure is not limited thereto, and the present disclosure is defined by the scope of the claims. Accordingly, the example embodiments are merely described below, by referring to the figures, to explain aspects of the present description.

In the drawings, the thicknesses of layers, films, panels, regions, etc., may be exaggerated for clarity. Like reference numerals designate like elements throughout the specification and duplicative descriptions may not be provided. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

A nickel-based lithium transition metal oxide according to an embodiment of the present disclosure includes a secondary particle (e.g., secondary particles) in which a plurality of primary particles are agglomerated.

The secondary particle (secondary particles) may include at least one of a small particle diameter secondary particle having an average particle diameter (D50) of about 2 μm to about 5 μm and a large particle diameter secondary particle having an average particle diameter of about 15 μm to about 20 μm. For example, the secondary particle may be a small particle diameter secondary particle, a large particle diameter secondary particle, or a mixture thereof, wherein the small particle diameter secondary particle may have an average particle diameter of about 2 μm to about 3 μm, and the large particle diameter secondary particle may have an average particle diameter of about 17 μm to about 20 μm. For example, the secondary particles may have a bimodal average particle diameter distribution. When the secondary particles have an average particle diameter within the above-described ranges, a pellet density of a positive active material powder and/or a mixture density of a positive electrode may be improved, and a cobalt-based lithium transition metal oxide having a nano-size average particle diameter may be well soaked (also referred to as "absorbed") into the surface layer of the nickel-based lithium transition metal oxide secondary particle. In some embodiments, for example, "well soaked" and/or "absorbed" means that the nano-sized cobalt-based lithium transition metal oxide is present or positioned between the primary particles in the surface layer (e.g., instead of substantially being positioned on or along the outer circumference of the primary particles in the surface layer). As used herein, the term "average particle diameter (D50)" may refer to the median value in a particle size distribution, as determined using a particle size analyzer. In some embodiments, "average particle diameter" may refer to the average value of the longest length or dimension of the particle.

When the nickel-based lithium transition metal oxide is composed of a mixture of the large particle diameter secondary particle and the small particle diameter secondary particle, a mixing ratio by weight thereof may be about 90:10 to about 50:50, for example about 90:10 to about 70:30, or about 80:20. When the nickel-based lithium transition metal oxide secondary particles satisfy the above-described range, the pellet density of a positive active material powder and/or the mixture density of a positive electrode may be improved.

The secondary particle includes a core and a surface layer surrounding the core, and the surface layer includes a plurality of primary particles and the nano-sized cobalt-based lithium transition metal oxide between the primary particles. When the nano-sized cobalt-based lithium transition metal oxide is included between (among) the primary particles in the surface layer, for example, absorbed in the surface layer of the secondary particle, the pellet density of the positive active material powder and/or the mixture density of a positive electrode may be improved. In addition, the cobalt-based lithium transition metal oxide may have or impart favorable high temperature and high voltage characteristics, such that gas generation at high voltage may be reduced, and accordingly, a rechargeable lithium battery having improved high temperature cycle-life characteristics and/or charge and discharge efficiency may be obtained.

A differential charge capacity (dQ/dV)-voltage curve of the rechargeable lithium battery including the positive active material for the rechargeable lithium battery may not have (may not exhibit) a peak between about 3.8 V to about 4.0 V. When a peak is not found (observed) within this voltage range, the nano-sized cobalt-based lithium transition metal oxide is understood to be absorbed into the surface layer of the secondary particle. Accordingly, the mixture density of the positive active material powder and/or the pellet density of the positive electrode may be improved, and for example, since the cobalt-based lithium transition metal oxide has favorable characteristics with respect to high temperature and/or high voltage, gas generation at the high voltage may be reduced, and accordingly, a rechargeable lithium battery having improved high temperature cycle-life characteristics and/or charge and discharge efficiency may be obtained.

The surface layer may be a region within or up to a depth of about 150 nm to about 200 nm from the surface of the positive active material. Here, "surface" refers to the outermost surface of the positive active material.

The nano-sized cobalt-based lithium transition metal oxide may be a compound represented by Chemical Formula 1:

$Li_aCo_xM_{1-x}O_2$.        Chemical Formula 1

In Chemical Formula 1, 0.9≤a≤1.05, 0.8≤x≤1.0, and M is at least one metal element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

In an embodiment, the nano-sized cobalt-based lithium transition metal oxide may be, for example, $LiCoO_2$.

The nano-sized cobalt-based lithium transition metal oxide may have an average particle diameter of less than about 1 μm, for example, about 100 nm to about 800 nm, about 100 nm to about 600 nm, about 100 nm to about 400 nm, about 100 nm to about 200 nm, about 100 nm to about 180 nm, about 100 nm to about 160 nm, about 100 nm to about 140 nm, or about 100 nm to about 120 nm. When the cobalt lithium transition metal oxide has an average particle diameter within the above-described range, the mixture density of a positive active material powder and/or the pellet density of a positive electrode may be improved, and the cobalt-based lithium transition metal oxide having a nano-size average particle diameter may be well absorbed in the surface layer of the nickel-based lithium transition metal oxide secondary particle.

A content of the cobalt-based lithium transition metal oxide may be about 5 wt % to about 15 wt %, for example about 5 wt % to about 10 wt %, about 5 wt % to about 9 wt %, or about 5 wt % to about 7 wt % based on a total weight of 100 wt % of the positive active material. When the content of cobalt-based lithium transition metal oxide is in the above-described ranges, a mixture density of the positive active material powder and/or a pellet density of the positive electrode may be improved.

In the positive active material, the nickel-based lithium transition metal oxide may be a compound represented by Chemical Formula 2:

$Li_aNi_xCo_yM_zO_2$.        Chemical Formula 2

In Chemical Formula 2, 0.9≤a≤1.05, 0.4≤x≤0.95, 0.1≤y≤0.3, 0.1≤z≤0.3, x+y+z=1, and M is at least one metal element selected from Mn, Al, Cr, Fe, V, Mg, Ti, Zr, Nb, Mo, W, Cu, Zn, Ga, In, Sn, La, and Ce.

In Chemical Formula 2, x (indicating a Ni mole ratio) may be about 0.4 to about 0.95, for example about 0.45 to about 0.80, about 0.45 to about 0.70, about 0.45 to about 0.65, about 0.50 to about 0.60, or about 0.53 to about 0.57. That is, Ni may be included in an amount of about 40 at % to about 95 at %, for example, about 45 at % to about 80 at %, about 45 at % to about 70 at %, about 45 at % to about 65 at %, about 50 at % to about 60 at %, or about 53 at % to about 57 at % based on a total amount of 100 at % of metals excluding lithium in the positive active material. Accordingly, a rechargeable lithium battery having improved charge and discharge efficiency and cycle-life characteristics may be attained.

The small particle diameter secondary particle of the nickel-based lithium transition metal oxide may have a needle-shape, a sheet-shape, or a combination thereof. When the small particle diameter secondary particle has the above-described shape, a mixture density of the positive active material powder and/or a pellet density of the positive electrode may be improved.

The positive active material may further include a cobalt-based lithium transition metal oxide (e.g., additional cobalt-based lithium transition metal oxide) disposed on the surface layer. In some embodiments, for example, the cobalt-based lithium transition metal oxide that is in the surface layer may be further included on the surface layer. The cobalt-based lithium transition metal oxide on the surface layer may form a continuous or substantially continuous layer, or may be present as an island shape or format, which may have a thickness of about 80 nm to about 120 nm. Accordingly, gas generation at high voltage may be reduced, and a rechargeable lithium battery having improved high temperature cycle-life characteristics and/or charge and discharge efficiency may be obtained.

A method of preparing a positive active material according to another embodiment is provided. Hereinafter, the preparing method is explained in more detail.

A nickel-based transition metal hydroxide and a lithium salt are mixed to prepare a first mixture; and the first mixture is first heat-treated under a rapid temperature-increasing condition at about 800° C. to about 1000° C. to prepare a first fired product including residual lithium.

The nickel-based transition metal hydroxide may include a large particle diameter secondary particle having an average particle diameter of about 15 μm to about 20 μm, and a small particle diameter secondary particle having an average particle diameter of about 2 μm to about 5 μm, mixed together in a weight ratio of about 90:10 to about 50:50.

In the first mixture, a mole ratio of Li/(Ni+Co+Mn) may be greater than or equal to about 0.99, for example, about 1.00 to about 1.25. When the mole ratio of Li/(Ni+Co+Mn) in the mixture is within the range, a large amount of lithium may remain on the surface of the nickel-based lithium transition metal oxide in the first fired product manufactured from the first heat-treating. This residual lithium may react with the cobalt-based transition metal hydroxide in the second heat-treating and thereby be used to prepare a positive active material.

The rapid temperature-increasing condition may include a process where a temperature of the first mixture is raised from an initial temperature of about 25° C. to about 100° C. to a first heat-treating reaction temperature of about 800° C. to about 1000° C. at a rate of about 4° C./min to about 6° C./min. This process may prevent or reduce cation mixing, and may generate a large amount of unreacted residual lithium on the surface of the nickel-based lithium transition metal oxide.

The first heat-treating may be performed at about 800° C. to about 1000° C. for about 1 hour to about 4 hours under an air atmosphere or an oxidizing gas atmosphere. Since the first heat-treating at high temperature (about 800° C. to about 1000° C.) under an air atmosphere or an oxidizing gas atmosphere is performed for a short time or duration (about 1 hour to about 4 hours), unreacted nickel-based transition metal hydroxide may be present in a large amount. Accordingly, a large amount of unreacted residual lithium may be included on the surface of the nickel-based lithium transition metal oxide, and cation mixing may be improved by suppressing generation of $Ni^{2+}$ and substitution of the $Ni^{2+}$ at a Li site.

In some embodiments, "oxidizing gas atmosphere" may refer to a gas atmosphere further including oxygen gas. The oxidizing gas atmosphere may have an oxygen content of about 20 volume % to about 40 volume %.

The first heat-treating process may be performed by setting a charging height of greater than or equal to about 5 cm, for example, about 5 cm to about 8 cm. When the heat-treating process is performed by inserting the mixture into the heat-treatment equipment from a height of greater than or equal to about 5 cm, production may be increased to thereby reduce production costs, and the amount of unreacted lithium remaining on the surface of the first fired product is increased. Accordingly, a positive active material may be well formed in the subsequent second heat-treating process.

The first fired product is mixed with the cobalt-based transition metal hydroxide, and then second heat-treated at a reaction temperature of about 750° C. to about 950° C.

The second heat-treating may be performed by increasing the temperature from an initial temperature of about 25° C. to about 100° C. up to a reaction temperature of about 750° C. to about 950° C. at a rate of about 5° C./min to about 10° C./min, maintaining the temperature at about 750° C. to about 950° C. for about 10 hours to about 15 hours, and then decreasing the temperature at a rate of about 5° C./min to about 10° C./min down to a final temperature of about 25° C. to about 100° C.

The second heat-treating process may be performed under an oxidizing gas atmosphere having an oxygen content of about 40 volume % to about 100 volume %.

The cobalt-based transition metal hydroxide may include $Co(OH)_2$.

The cobalt-based transition metal hydroxide may have an average particle diameter of about 100 nm to about 200 nm.

When the cobalt-based transition metal hydroxide has an average particle diameter within the above-described range, the lithium cobalt-based transition metal oxide prepared during the second heat-treating process may not simply be coated on the surface of the nickel-based lithium transition metal oxide secondary particle, but may be absorbed among or between primary particles within the surface layer of the secondary particle.

A content of the cobalt-based transition metal hydroxide may be adjusted or selected so that the nano-sized cobalt-based lithium transition metal oxide is included in an amount of about 5 wt % to about 15 wt % based on a total weight of 100 wt % of the final product positive active material.

When the content of the cobalt-based transition metal hydroxide is within the above-described range, a mixture density of the positive active material powder and/or a pellet density of the positive electrode may be improved.

The lithium salt may be at least one of lithium hydroxide, lithium carbonate, lithium sulfate, and lithium nitrate.

The small particle diameter nickel-based transition metal hydroxide secondary particle may have a needle-shape, a sheet-shape, or a combination thereof. The small particle diameter nickel-based transition metal oxide secondary particle prepared according to the methods described herein may maintain the above-described shape or form. Accordingly, a mixture density of the positive active material powder and/or a pellet density of the positive electrode may be improved. In contrast, when a positive active material is prepared by separately preparing and heat treating a large particle diameter nickel-based transition metal oxide secondary particle and a small particle diameter nickel-based transition metal oxide secondary particle, the small particle diameter nickel-based transition metal oxide secondary particle in the final product may have a spherical shape. In this case, the above pellet density and mixture density may not be improved.

The above-described method provides the positive active material for a rechargeable lithium battery according to the embodiment of the present disclosure, which includes a nickel-based lithium transition metal oxide including a secondary particle in which a plurality of primary particles are agglomerated, wherein the secondary particle includes a core and a surface layer surrounding the core, and the surface layer includes a plurality of primary particles and a nano-sized cobalt-based lithium transition metal oxide among (between) the primary particles.

Another embodiment of the present disclosure provides a rechargeable lithium battery including a positive electrode including the positive active material; a negative electrode including a negative active material; a separator disposed between the positive electrode and the negative electrode; and an electrolyte with the positive electrode, negative electrode, and separator.

The positive electrode includes a current collector, and a positive active material layer formed on the current collector and including a positive active material.

In the positive active material layer, a content of the positive active material may be about 90 wt % to about 98 wt % based on a total weight of the positive active material layer. In addition, the positive active material layer may further include a binder and a conductive material. Herein, the amount of the binder and the conductive material may each independently be about 1 wt % to about 5 wt % based on a total weight of the positive active material layer.

The binder may include polyvinyl alcohol, carboxylmethyl cellulose, hydroxypropyl cellulose, diacetyl cellulose, polyvinyl chloride, polyvinylfluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and/or the like, but embodiments of the present disclosure are not limited thereto.

Non-limiting examples of the conductive material include a carbon-based material (such as natural graphite, artificial graphite, carbon black, acetylene black, ketjen black, carbon fiber, and/or the like); a metal-based material of a metal powder and/or a metal fiber including copper, nickel, aluminum, silver, and/or the like; a conductive polymer (such as a polyphenylene derivative); and mixtures thereof.

The current collector may include an aluminum foil, a nickel foil, or a combination thereof, but embodiments of the present disclosure are not limited thereto.

The negative electrode includes a current collector, and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide as described below.

The material that reversibly intercalates/deintercalates lithium ions may include a carbon material. The carbon material may be any suitable carbon-based negative active material used in a rechargeable lithium ion battery. Non-limiting examples thereof may include crystalline carbon, amorphous carbon, and mixtures thereof. The crystalline carbon may be non-shaped (e.g., have no particular shape), or may be a sheet, flake, spherical, or fiber shaped natural graphite and/or artificial graphite. The amorphous carbon may be or include a soft carbon, a hard carbon, a mesophase pitch carbonization product, a fired coke, and/or the like.

The lithium metal alloy includes an alloy of lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be Si, Si, SiOx (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and a combination thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and a combination thereof), and/or the like. At least one of these materials may be mixed with $SiO_2$. The elements Q and R may be selected from Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), Zn, cadmium (Cd), boron (B), Al, gallium (Ga), Sn, In, thallium (Tl), Ge, phosphorus (P), arsenic (As), Sb, bismuth (Bi), sulfur (S), selenium (Se), tellurium (Te), polonium (Po), and combinations thereof.

The transition metal oxide may be vanadium oxide, lithium vanadium oxide, and/or lithium titanium oxide.

In the negative active material layer, the negative active material may be included in an amount of about 95 wt % to about 99 wt % based on the total weight of the negative active material layer.

In an embodiment of the present invention, the negative active material layer includes a binder, and optionally a conductive material. In the negative active material layer, a content of the binder may be about 1 wt % to about 5 wt % based on a total weight of the negative active material layer. When the negative active material layer further includes a conductive material, the negative active material layer may include about 90 wt % to about 98 wt % of the negative active material, about 1 wt % to about 5 wt % of the binder, and about 1 wt % to about 5 wt % of the conductive material.

The binder improves the binding properties of negative active material particles with one another and with a current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, an ethylene propylene copolymer, polyacrylonitrile, polystyrene, polyurethane, polytetrafluoroethylene, polyvinylidene fluoride, polyethylene, polypropylene, polyamideimide, polyimide, and combinations thereof.

The water-soluble binder may be a styrene-butadiene rubber (SBR), an acrylated styrene-butadiene rubber, an acrylonitrile-butadiene rubber, an acrylic rubber, a butyl rubber, a fluorine rubber, an ethylene oxide-containing polymer, polyvinylpyrrolidone, polyepichlorohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or any combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of about 0.1 to about 3 wt % based on 100 wt % of the negative active material.

The conductive material may include a carbon-based material such as natural graphite, artificial graphite, carbon black, acetylene black, ketjen black, a carbon fiber, and/or the like; a metal-based material of a metal powder or a metal fiber including copper, nickel, aluminum silver, and/or the like; a conductive polymer such as a polyphenylene derivative; or any mixture thereof.

The current collector may include at least one selected from a copper foil, a nickel foil, a stainless steel foil, a titanium foil, a nickel foam, a copper foam, a polymer substrate coated with a conductive metal, and combinations thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, dimethylacetate, methylpropionate, ethylpropionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (where R may be a C2 to C20 linear, branched, and/or cyclic hydrocarbon group, and R may include a double bond, an aromatic ring, and/or an ether bond), and/or the like, amides (such as dimethyl formamide, and/or the like), dioxolanes (such as 1,3-dioxolane, and/or the like), sulfolanes, and/or the like.

The organic solvent may be used alone or in a mixture. When the organic solvent is used in a mixture, a mixing ratio of the solvents may be controlled or selected in accordance with desired battery performance.

In some embodiments, the organic solvent may further include an aromatic hydrocarbon-based organic solvent. Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4 trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include an additive of vinylene carbonate or an ethylene carbonate-based compound as a cycle-life improvement additive.

Non-limiting examples of the ethylene-based carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The cycle-life improvement additive may be included at any suitable amount, as understood by those having ordinary skill in the art.

The lithium salt dissolved in an organic solvent supplies a battery with lithium ions, facilitates basic operation of the rechargeable lithium battery, and improves lithium ion transport between a positive electrode and a negative electrode. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, for example an integer of 1 to 20), LiCl, LiI, $LiB(C_2O_4)_2$ (lithium bis(oxalato) borate, LiBOB). A concentration of the lithium salt may be about 0.1 M to about 2.0 M. When the lithium salt is included at the above concentration range, an electrolyte may have excellent performance and lithium ion mobility due to optimal or desired electrolyte conductivity and viscosity.

The rechargeable lithium battery may further include a separator between the negative electrode and the positive electrode, depending on the type or form of battery. Non-limiting examples of a suitable separator material include polyethylene, polypropylene, polyvinylidene fluoride, and multi-layers thereof (such as a polyethylene/polypropylene double-layered separator, a polyethylene/polypropylene/polyethylene triple-layered separator, and a polypropylene/polyethylene/polypropylene triple-layered separator).

FIG. 1 is an exploded perspective view of a rechargeable lithium battery according to an embodiment of the present disclosure. The rechargeable lithium battery is illustrated as a prismatic battery, but embodiments of the present disclosure are not limited thereto, and embodiments of the present disclosure may include variously-shaped batteries (such as a cylindrical battery, a pouch battery, a button-type battery, a coin-type battery, and/or the like).

Referring to FIG. 1, a rechargeable lithium battery 100 according to an embodiment of the present disclosure includes an electrode assembly 40 manufactured by winding a separator 30 interposed between a positive electrode 10 and a negative electrode 20, and a case 50 for housing the electrode assembly 40. An electrolyte may be impregnated in the positive electrode 10, the negative electrode 20, and the separator 30.

Hereinafter, examples of the present disclosure and comparative examples are described. However, the following examples are merely examples, and embodiments of the present disclosure are not limited thereto.

EXAMPLES

Example 1

(Preparation of Positive Active Material)

Lithium carbonate ($Li_2CO_3$) and $Ni_{0.55}Co_{0.25}Mn_{0.20}(OH)_2$ as the nickel-based transition metal hydroxide were mixed to have a mole ratio of Li:(Ni+Co+Mn)=1.01:1.00. Herein, the $Ni_{0.55}Co_{0.25}Mn_{0.20}(OH)_2$ was obtained by mixing large particle diameter nickel-based lithium transition metal hydroxide and small particle diameter nickel-based lithium transition metal hydroxide (having the same composition but a different (smaller) diameter), in a weight ratio of 8:2.

The first mixture was first heat-treated by increasing the temperature from 25° C. to 900° C. at a rate of 5° C./min, maintaining the temperature at 900° C. for 2 hours, and decreasing the temperature to 25° C. at a rate of 5° C./min to prepare a first fired product including large particle diameter nickel-based lithium transition metal oxide represented by $Li_{1.01}Ni_{0.55}Co_{0.25}Mn_{0.20}O_2$ and small particle diameter nickel-based lithium transition metal oxide represented by $Li_{1.01}Ni_{0.55}Co_{0.25}Mn_{0.20}O_2$. The first heat-treating process was performed with a charging height of 5 cm under an air atmosphere.

The first fired product was mixed with $Co(OH)_2$ to include 5 wt % of the nano-sized cobalt-based lithium transition metal oxide based on a total weight of 100 wt % of a positive active material as a final product. Subsequently, a second heat-treating was performed by increasing the temperature from 25° C. to 850° C. at a rate of 5° C./min, maintaining the temperature at 850° C. for 10 hours, and decreasing the temperature at a rate of 5° C./min down to 25° C. to prepare the positive active material including the large particle diameter nickel-based lithium transition metal oxide represented by $LiNi_{0.55}Co_{0.25}Mn_{0.20}O_2$ and the small particle diameter nickel-based lithium transition metal oxide represented by $LiNi_{0.55}Co_{0.25}Mn_{0.20}O_2$ in a weight ratio of 8:2 and including $LiCoO_2$ in a surface layer of the secondary particle. The second heat-treating was performed under an oxygen ($O_2$) atmosphere.

Herein, the large particle diameter nickel-based lithium transition metal hydroxide of $Ni_{0.55}Co_{0.25}Mn_{0.20}(OH)_2$ had an average particle diameter (D50) of 19.5 μm, the small particle diameter nickel-based lithium transition metal hydroxide of $Ni_{0.55}Co_{0.25}Mn_{0.20}(OH)_2$ had an average particle diameter (D50) of 2.6 μm, and the $Co(OH)_2$ had an average particle diameter (D50) of 100 nm.

Manufacture of Positive Electrode 94 wt % of the positive active material, 3 wt % of ketjen black, and 3 wt % of polyvinylidene fluoride were mixed in N-methyl pyrrolidone solvent to prepare positive active material slurry. The positive active material slurry was coated on an Al foil followed by drying and compressing the same to manufacture a positive electrode.

Manufacture of Half-Cell

The manufactured positive electrode, a lithium metal counter electrode, a separator, and an electrolyte were used to manufacture a CR2032-type half-cell according to standard methods in the related art. The electrolyte was prepared by dissolving 1.0 M $LiPF_6$ in a mixed solvent of ethylene carbonate and dimethyl carbonate (a volume ratio of 50:50). The separator was a 20 μm-thick polyethylene porous film.

Example 2

A positive active material, a positive electrode, and a half-cell were manufactured according to the same method as Example 1 except that $Co(OH)_2$ was added so that 10 wt % of the nano-sized cobalt-based lithium transition metal oxide was included based on a total weight of 100 wt % of the positive active material of a final product to the first fired product in the preparation of the positive active material.

Comparative Example 1

A positive electrode and a half-cell were manufactured according to substantially the same method as Example 1, except that commercially available NCM622 ($LiNi_{0.6}Co_{0.2}Mn_{0.2}$, Umicore) was used as a positive active material.

Comparative Example 2

A positive active material, a positive electrode, and a half-cell were manufactured according to substantially the same method as Example 1, except that $Co_3O_4$ having an average particle diameter (D50) of 4.5 μm was used instead of $Co(OH)_2$ with the first fired product. The cobalt oxide was included in an amount of 5 wt % based on a total weight of 100 wt % of the positive active material final product, and the mixture was mixed at 2400 rpm for 5 minutes in a 20 L powder mixer in the preparation of the positive active material.

Comparative Example 3

A positive active material, a positive electrode, and a half-cell were manufactured according to substantially the same method as Example 1, except that $Co_3O_4$ having an average particle diameter (D50) of 4.5 μm was used instead of $Co(OH)_2$ to the first fired product, wherein the cobalt oxide was included in an amount of 10 wt % based on a total weight of 100 wt % of the positive active material of a final product, and the mixture was mixed at 2400 rpm for 5 minutes in a 20 L powder mixer, and dry-coated in the preparation of the positive active material.

Reference Example 1

A positive active material, a positive electrode, and a half-cell were manufactured according to substantially the same method as Example 1, except that $Co(OH)_2$ was used so that the cobalt-based lithium transition metal oxide was included in an amount of 15 wt % based on a total weight of 100 wt % of the positive active material.

Reference Example 2

A positive active material, a positive electrode, and a half-cell were manufactured according to substantially the same method as Example 1, except that as for $Ni_{0.55}Co_{0.25}Mn_{0.20}(OH)_2$, the large particle diameter secondary particles were used alone, without the small particle diameter secondary particles.

Evaluation Example 1: Measurement of Pellet Density and Mixture Density of Electrode Plate The positive active materials and the positive electrodes manufactured in Examples 1 and 2, Comparative Examples 1 to 3, and Reference Examples 1 and 2 were used to measure pellet densities of the positive active materials and mixture densities of the electrode plates, and the results are shown in Table 1.

The pellet densities were measured and recorded for within 3.0000 g of each positive active material (an error range±0.0004 g), wherein the positive active materials were maintained under 4 tons of a pressure for 30 seconds in a 13 mm-sized KBr pellet die to measure a reduced height, and a weight per volume.

In addition, the electrode plate mixture density was measured by dividing the "electrode plate mixture weight" by the "electrode plate mixture thickness," and the "electrode plate mixture weight" was calculated by subtracting the "substrate weight per unit area" from the "electrode plate weight per unit area," and the "electrode plate mixture thickness" was obtained by subtracting the "substrate thickness" from the "electrode plate thickness."

TABLE 1

| | Pellet density ($g/cm^3$) | Mixture density of Electrode plate ($g/cm^3$) |
|---|---|---|
| Example 1 | 3.51 | 3.61 |
| Example 2 | 3.45 | 3.58 |
| Comparative Example 1 | 3.34 | 3.52 |
| Comparative Example 2 | 3.42 | 3.57 |
| Comparative Example 3 | 3.35 | 3.53 |
| Reference Example 1 | 3.43 | 3.56 |
| Reference Example 2 | 3.29 | 3.40 |

The positive active materials according to Examples 1 and 2 exhibited increased pellet density compared with those of the positive active materials according to Comparative Examples 1 to 3, and mixture densities of the electrode plates also exhibited the same result.

Evaluation Example 2: Cobalt-Based Lithium Transition Metal Oxide Coating Layer

EDS (Energy Dispersive X-ray Spectroscopy) Measurement Photograph

Figure 2:
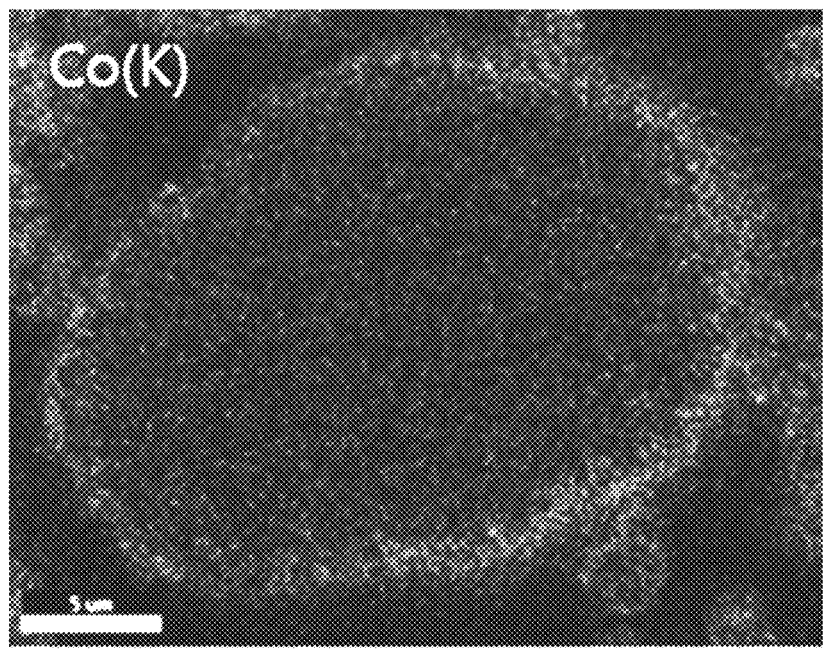
FIG. 2 is a photographic image showing a spatial distribution of cobalt (Co) elements within the cross section of the positive active material prepared in Example 1, as analyzed by EDS (energy dispersive spectroscopy).

The cross section of the positive active material according to Example 1 was analyzed using EDS to confirm that Ni, Co, and Mn were well dispersed inside the particle (e.g., in a core) and on the surface (e.g., in or as a surface layer) of the positive active material, and an atomic mol % at each spot of the nickel-based lithium transition metal oxide secondary particle was measured. FIG. 2 is a cross sectional EDS image of the positive active material showing a Co elemental analysis (K shell).

As shown in FIG. 2, Co was dispersed throughout the inside the nickel-based lithium transition metal oxide secondary particle, and was also present with a high density (concentration) in a surface layer region corresponding to a depth of about 200 nm from the surface of the secondary particle. Without being bound by the correctness of any theory or explanation, it is thought that the concentrated Co in the surface layer region is the result of $Co(OH)_2$ reacting with residual lithium on the surface of the nickel-based lithium transition metal oxide secondary particle to form nano-sized $LiCoO_2$.

Differential Capacity (dQ/dV)-Voltage Charge Curve Analysis

Figure 3A:
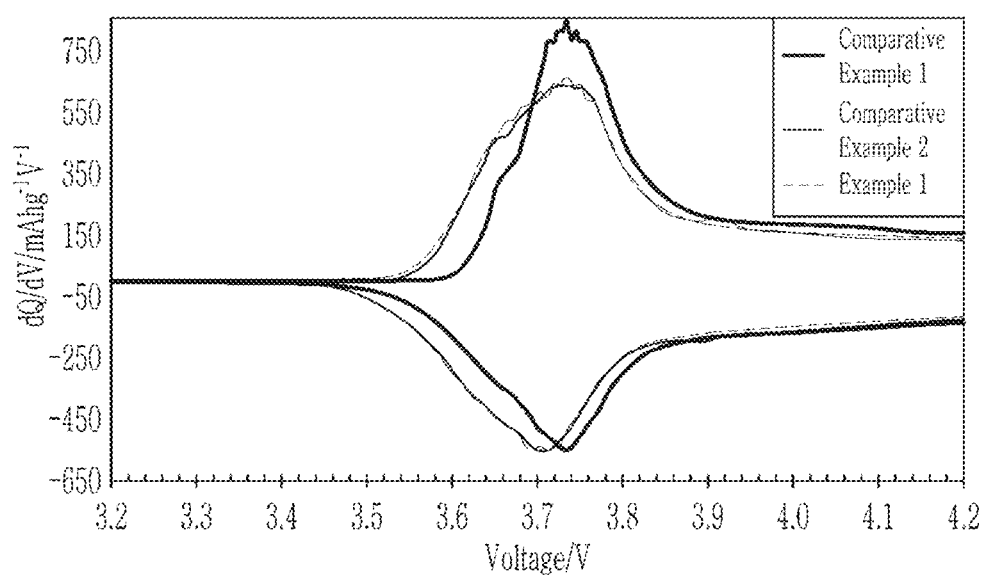
FIG. 3A is a graph showing the differential charge capacity (dQ/dV)-voltage curves of the rechargeable lithium battery cells according to Example 1 and Comparative Examples 1 and 2.
Figure 3B:
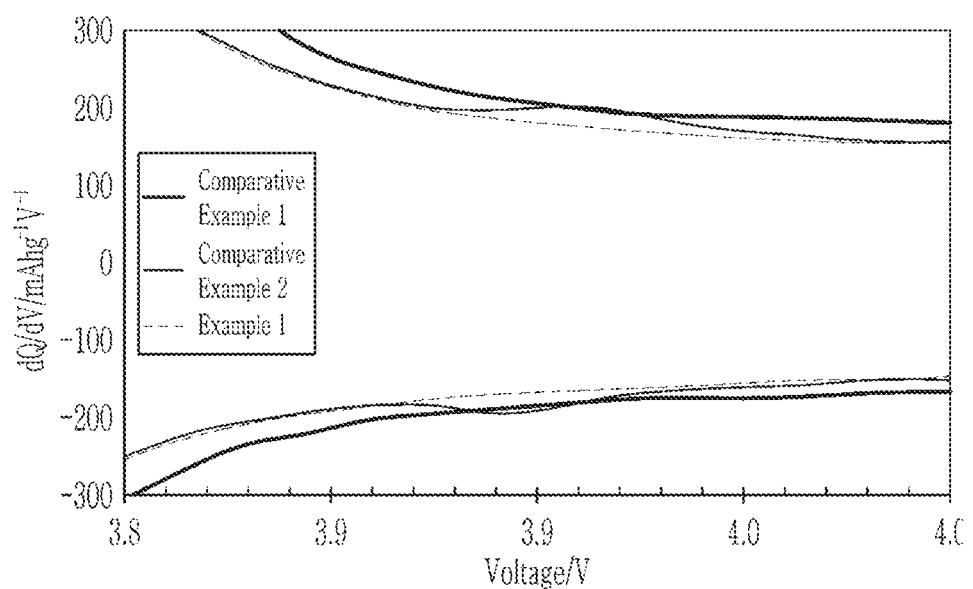
FIG. 3B is an enlarged graph of FIG. 3A between 3.8 V to 4.0 V.
Figure 4A:
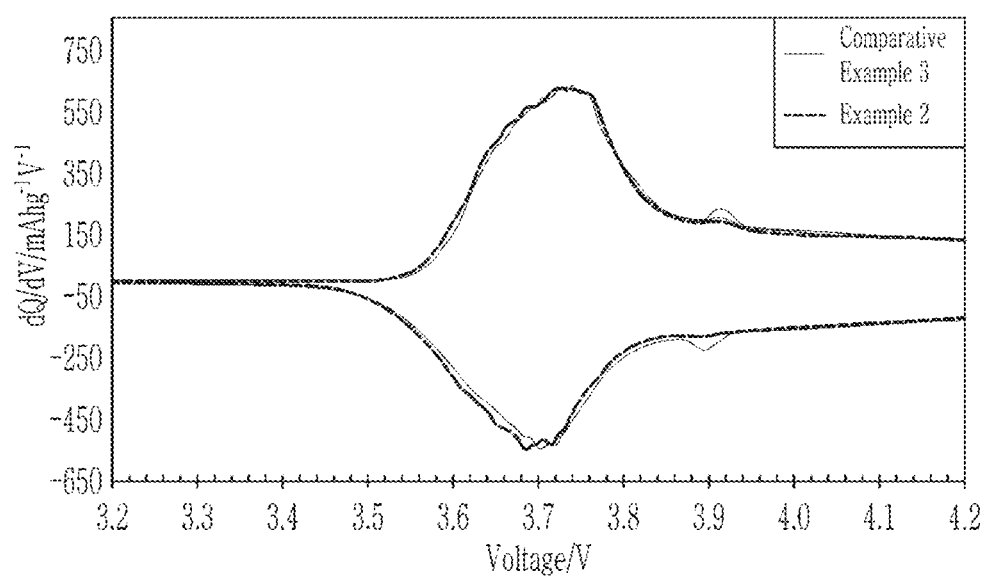
FIG. 4A is a graph showing the differential charge capacity (dQ/dV)-voltage curves of the rechargeable lithium battery cells according to Example 2 and Comparative Example 3.

The half-cells according to Examples 1 and 2 and Comparative Examples 1 to 3 were charged and discharged once at 0.2C, and then charged and discharged twice using the same method. FIG. 3A and FIG. 4A are graphs showing the first differential charge capacity (dQ/dV)-voltage curve, and FIG. 3B and FIG. 4B are enlarged graphs of a voltage range of 3.8 to 4.0 V in the 1st differential charge capacity (dQ/dV)-voltage curve.

In FIG. 3A and FIG. 4A, a peak within a voltage range of 3.8 to 4.0 V indicates the presence of LCO ($LiCoO_2$). The positive active materials according to Example 1 and Comparative Example 2 were prepared by coating a cobalt compound under different conditions on the surface of the nickel-based lithium transition metal oxide secondary particle, and when FIG. 3B was examined, Example 1 did not show the peak, but Comparative Example 2 clearly showed the peak. Accordingly, it was confirmed that in Example 1, LCO was absorbed in the surface layer of the nickel-based lithium transition metal oxide secondary particle (including a secondary particle nickel-based lithium transition metal oxide having a bimodal average particle diameter), as formed by reacting residual lithium on the surface of the nickel-based lithium transition metal oxide with nano-sized cobalt-based transition metal hydroxide. In contrast, since the aforementioned condition in Example 1 was not satisfied during preparation of the positive active material of Comparative Example 2, even though the same amount of cobalt compound was coated, LCO was present in an island shape on the surface of the nickel-based lithium transition metal oxide secondary particle or as a simple mixture with the nickel-based lithium transition metal oxide secondary particle.

Figure 4B:
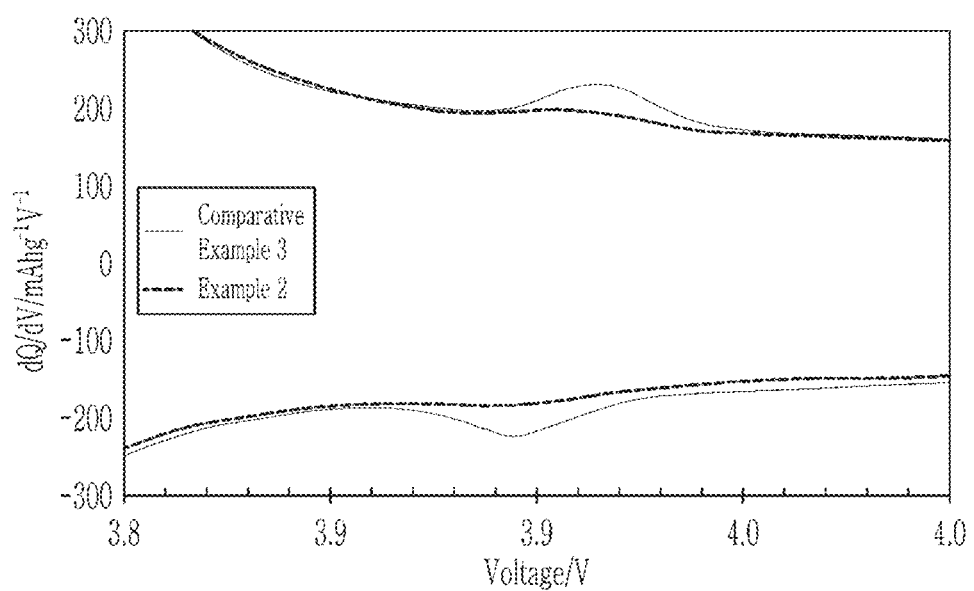
FIG. 4B is an enlarged graph of FIG. 4A between 3.8 V to 4.0 V.

In addition, as an input amount of $Co(OH)_2$ was further increased in Example 2 under the same condition as Example 1, the LCO peak appeared little by little (e.g., with correspondingly increased height) (refer to FIG. 4B). This result shows that in Example 2, LCO was absorbed in the surface layer of the nickel-based lithium transition metal oxide secondary particle and simultaneously, formed on the surface of the secondary particle. Referring to FIG. 4B, Comparative Example 3 exhibited a larger peak than Example 2.

Evaluation Example 3: Initial Charge and Discharge Capacity and Charge and Discharge Efficiency The half-cells according to Examples 1 and 2, Comparative Examples 1 to 3, and Reference Examples 1 and 2 were respectively charged and discharged once at 0.2C in a voltage range of 3.0 to 4.3V, and the charge capacities, discharge capacities, and charge and discharge efficiencies were obtained. The results are shown in Table 2.

TABLE 2

|  | Charge capacity (mAh/g) | Discharge capacity (mAh/g) | Charge and discharge efficiency (%) |
| --- | --- | --- | --- |
| Example 1 | 184.72 | 174.32 | 94.37% |
| Example 2 | 184.08 | 172.94 | 93.95% |
| Comparative Example 1 | 187.25 | 167.78 | 89.60% |
| Comparative Example 2 | 184.65 | 170.93 | 92.57% |
| Comparative Example 3 | 183.65 | 169.33 | 92.20% |
| Reference Example 1 | 183.06 | 170.65 | 93.22% |
| Reference Example 2 | 183.93 | 167.11 | 90.86% |

As shown in Table 2, the half-cells according to Examples 1 and 2 exhibited excellent charge and discharge efficiency compared with those of Comparative Examples 1 to 3.

Evaluation Example 4: High Temperature Cycle-life Characteristics

Figure 5:
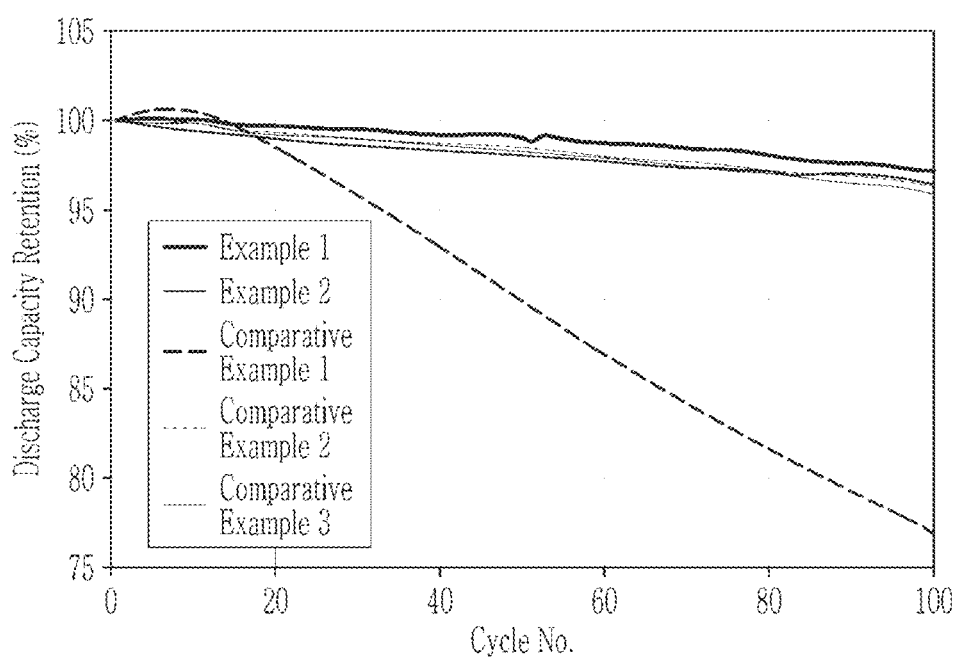
FIG. 5 is a graph showing high temperature cycle-life characteristics of the half-cells manufactured according to Example 1, Example 2, and Comparative Examples 1 to 3.
Figure 6:
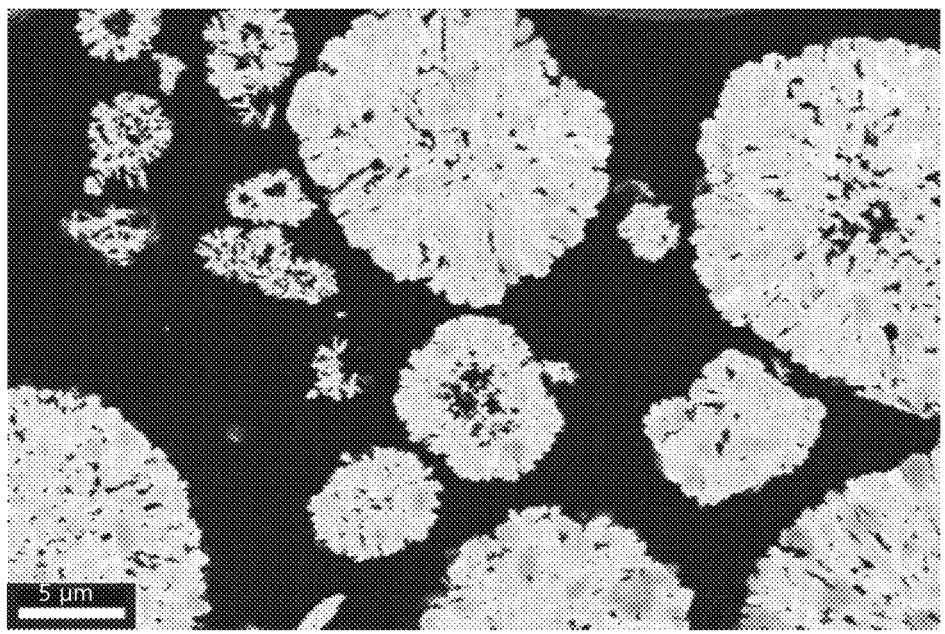
FIG. 6 is a photographic image showing the combination of large particle diameter and small particle diameter secondary particles.

The half-cells according to Examples 1 and 2, Comparative Examples 1 to 3, and Reference Examples 1 and 2 were charged at a high temperature of 45° C. under a constant current-constant voltage (CC-CV) mode at 1.0C (1 C=160 mAh/g) up to 4.3 V and then at 0.05C, and discharged under a constant current mode at 1.0C to 3.0 V, which was regarded as one charge and discharge cycle. This cycle was repeated a total of 100 times, and the discharge capacity was measured at each cycle. The capacity retention at the $100^{th}$ cycle was calculated according to Equation 1, and the results are shown in Table 3. A graph of the high temperature (45° C.) cycle-life graph is shown in FIG. 5.

Capacity retention [%] at $100^{th}$ cycle=[Discharge capacity at $100^{th}$ cycle/Discharge capacity at 1st cycle]×100    Equation 1

TABLE 3

|  | High-temperature cycle-life characteristics capacity retention [%] (45° C./100 cycles) |
| --- | --- |
| Example 1 | 97.20% |
| Example 2 | 96.46% |
| Comparative Example 1 | 76.90% |
| Comparative Example 2 | 96.36% |
| Comparative Example 3 | 95.90% |
| Reference Example 1 | 95.85% |
| Reference Example 2 | 90.07% |

As shown in Table 3, the half-cells of the Examples exhibited excellent high temperature discharge capacity retention compared with the half-cells of the Comparative Examples. In addition, as shown in FIG. 4, the half-cells of the Examples exhibited improved high temperature cycle-life characteristics compared with the half-cells of Comparative Examples 1 to 3.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

10: positive electrode
20: negative electrode
30: separator
40: electrode assembly
50: battery case
100: rechargeable lithium battery

What is claimed is:

1. A positive active material for a rechargeable lithium battery, comprising:
    a nickel-based lithium transition metal oxide comprising a secondary particle in which a plurality of primary particles are agglomerated,
    the secondary particle comprises a core and a surface layer surrounding the core, and
    the surface layer comprises a plurality of primary particles and cobalt-based lithium transition metal oxide soaked between the primary particles,
    wherein the secondary particle has a bimodal average particle diameter distribution.

2. The positive active material of claim 1, wherein the secondary particle comprises a small particle diameter secondary particle having an average particle diameter (D50) of about 2 μm to about 5 μm and/or a large particle diameter secondary particle having an average particle diameter of about 15 μm to about 20 μm.

3. The positive active material of claim 2, wherein the small particle diameter secondary particle has a needle-shape, a sheet-shape, or a combination thereof.

4. The positive active material of claim 1, wherein the cobalt-based lithium transition metal oxide has an average particle diameter of about 100 nm to about 200 nm.

5. The positive active material of claim 1, wherein a content of the cobalt-based lithium transition metal oxide is about 5 wt % to about 15 wt % based on a total amount of 100 wt % of the positive active material.

6. The positive active material of claim 1, wherein the cobalt-based lithium transition metal oxide is a compound represented by Chemical Formula 1:

$$Li_aCo_xM_{1-x}O_2 \qquad \text{Chemical Formula 1}$$

wherein, in Chemical Formula 1, 0.9≤a≤1.05, 0.8≤x≤1.0, and M is at least one metal element selected from Ni, Mn, Al, Cr, Fe, V, Mg, Ti, Zr, Nb, Mo, W, Cu, Zn, Ga, In, Sn, La, and Ce.

7. The positive active material of claim 1, wherein the surface layer is a region corresponding to a depth of about 150 nm to about 200 nm from a surface of the positive active material.

8. The positive active material of claim 1, wherein a differential charge capacity (dQ/dV)-voltage curve of the rechargeable lithium battery comprising the positive active material does not have a peak at a range of about 3.8 V to about 4.0 V.

9. The positive active material of claim 1, wherein the nickel-based lithium transition metal oxide is a compound represented by Chemical Formula 2:

$$Li_aNi_xCo_yM_zO_2 \qquad \text{Chemical Formula 2,}$$

wherein, in Chemical Formula 2, 0.9≤a≤1.05, 0.4≤x≤0.95, 0.1≤y≤0.3, 0.1 z≤0.3, x+y+z=1, M is at least one metal element selected from Mn, Al, Cr, Fe, V, Mg, Ti, Zr, Nb, Mo, W, Cu, Zn, Ga, In, Sn, La, and Ce.

10. The positive active material of claim 1, wherein the positive active material further comprises the cobalt-based lithium transition metal oxide on the surface layer.

11. A rechargeable lithium battery comprising:
    a positive electrode comprising the positive active material of claim 1;
    a negative electrode comprising a negative active material; and
    an electrolyte with the positive electrode and the negative electrode.

12. A positive active material for a rechargeable lithium battery, comprising:
    a nickel-based lithium transition metal oxide comprising a secondary particle in which a plurality of primary particles are agglomerated,
    the secondary particle comprises a core and a surface layer surrounding the core, and
    the surface layer comprises a plurality of primary particles and cobalt-based lithium transition metal oxide soaked between the primary particles,
    wherein the secondary particle comprises a small particle diameter secondary particle having an average particle diameter (D50) of about 2 μm to about 5 μm and a large particle diameter secondary particle having an average particle diameter of about 15 μm to about 20 μm, and
    wherein a mixing ratio by weight of the large particle diameter secondary particle and the small particle diameter secondary particle is about 90:10 to about 50:50.

13. A method of preparing a positive active material for a rechargeable lithium battery, the positive active material comprising:
    a nickel-based lithium transition metal oxide comprising a secondary particle in which a plurality of primary particles are agglomerated,
    the secondary particle comprises a core and a surface layer surrounding the core, and
    the surface layer comprises a plurality of primary particles and cobalt-based lithium transition metal oxide soaked between the primary particles, and the method comprising:
mixing a nickel-based transition metal hydroxide and a lithium salt to prepare a first mixture;
first heat-treating the first mixture under a temperature-increasing condition at about 800° C. to about 1000° C. to prepare a first fired product comprising residual lithium; and
mixing the first fired product with a cobalt-based transition metal hydroxide and second heat-treating the same at about 750° C. to about 950° C. to obtain the positive active material.

14. The method of claim 13, wherein the nickel-based transition metal hydroxide comprises a large particle diameter secondary particle having an average particle diameter of about 15 μm to about 20 μm and a small particle diameter secondary particle having an average particle diameter of about 2 μm to about 5 μm, in a weight ratio of about 90:10 to about 50:50.

15. The method of claim 13, wherein in the first mixture, a mole ratio of Li/(Ni+Co+Mn) is greater than or equal to about 0.99.

16. The method of claim 13, wherein the temperature-increasing condition comprises a process where an initial temperature is raised from about 25° C. to about 100° C. to a first heat-treating reaction temperature of about 800° C. to about 1000° C. at a rate of about 4° C./min to about 6° C./min.

17. The method of claim 13, wherein the first heat-treating is performed in an air atmosphere or an oxidizing gas atmosphere for about 1 hour to about 4 hours.

18. The method of claim 13, wherein the cobalt-based transition metal hydroxide comprises $Co(OH)_2$.

19. The method of claim 13, wherein the cobalt-based transition metal hydroxide has an average particle diameter of about 100 nm to about 200 nm.

20. The method of claim 13, wherein the lithium salt comprises at least one selected from lithium hydroxide, lithium carbonate, lithium sulfate, and lithium nitrate.

21. The method of claim 14, wherein the small particle diameter secondary particle has a needle-shape, a sheet-shape, or a combination thereof.

* * * * *